3,048,599
METHOD FOR THE PRODUCTION OF LACTONES OF SATURATED DELTA-HYDROXYMONO- OR DICARBOXYLIC ACIDS WITH MORE THAN 5 CARBON ATOMS
Karl Wilhelm Rosenmund, 11 Caprivistrasse, and Hartwig Bach, 22 Kleiststrasse, both of Kiel, Germany
No Drawing. Filed Aug. 21, 1959, Ser. No. 835,173
Claims priority, application Germany Aug. 27, 1958
6 Claims. (Cl. 260—343.5)

The present invention relates to a method for the production of lactones, and in particular to a method for the production of lactones of saturated delta-hydroxymono- or dicarboxylic acids with more than 5 carbon atoms.

The present invention provides a method of obtaining lactones of the kind specified from compounds of the class consisting of cyclohexane-1,3-dione, 4-propylcyclohexane-1,3-dione, 4-allylcyclohexane-1,3-dione, 4-crotylcyclohexane-1,3-dione and bis-(2,6-diketocyclohexanyl)-methane.

According to the invention a compound of the class referred to is subjected to hydrogenation by the action of hydrogen under pressure in the presence of a nickel hydrogenation catalyst, while dissolved in aqueous caustic alkali, whereby combined ring cleavage and hydrogenation occur, and the delta-hydroxy-carboxylic acid so obtained in the form of its alkali-metal salt is liberated by acidifying the reaction mixture and is converted into the corresponding lactone by heating.

Though it is known to cleave cyclohexane-1,3-dione with formation of delta-ketocarboxylic acids by means of a drastic treatment with alkali or acids (H. Stetter, W. Dierichs Chemische Berichte 90, 61, 290, 1061 (1952), Stetter and Hoehne Chemische Berichte 91, 1344 (1958), Stetter and Horst Rauhut Chemische Berichte 91, 2544 (1958)), it is, however, surprising that delta-hydroxycarboxylic acids are formed in quantity by the simultaneous action of agents which effect ring cleavage and hydrogenation.

It is known that cleavage of cyclohexane-1,3-dione can only be effected when the two carbonyl groups are intact. It is, however, also known that carbonyl groups are attacked by catalytic hydrogenation, e.g. are converted into hydroxy groups. According to investigations conducted by M. Delepin and A. Horeau (Chemisches Zentralblatt 1936, I, 2324), cyclohexanone is converted in cyclohexanol, the presence of alkali being conducive for this reaction. According to W. Hückel (Chemische Berichte 91, 1290 (1958)), hydrogenation of methylcyclohexanone by means of a nickel catalyst affords methylcyclohexanol, and according to J. M. Sprague and H. Adkins (J. Amer. Chem. Soc. 56, 2669 (1934)), 1,3-diketones are frequently reduced with Raney nickel under pressure to the respective dihydroxy compounds. On the basis of these examples, to which others could be added, it was to be assumed that cyclohexane-1,3-dione would be attacked at the carbonyl group, so that a cleavage to ketocarboxylic acids could not be obtained.

The cleavage of the cyclohexane-1,3-dione, however, is a very slow reaction according to prior publications (see above H. Stetter), whereas the hydrogenation of the carbonyl groups is a rather rapid reaction (see above M. Delepin). In consequence it was to be expected that the hydrogenation of the carbonyl group would be effected before the acid cleavage, so that the latter could not take place.

Whereas in the preparation of lactones by first producing ketocarboxylic acids by acid cleavage, isolating these acids and then hydrogenating them, besides being inconvenient does not give very high yields, the method according to the present invention besides being simpler gives much higher yields. As an example, the production of the lactone of 5-hydroxynonanylic acid-1 is cited. By forming and isolating the ketocarboxylic acid and then hydrogenating it has not been possible to obtain yields higher than 65% whereas by treatment according to the present invention yields of 87% have been obtained.

EXAMPLE 1

*Lactone of 5-Hydroxynonanoic Acid*

A solution of 15.4 grams 4-propylcyclohexane-1,3-dione and 16 grams NaOH in 144 ml. $H_2O$ is agitated for 12 hours under hydrogen with the addition of Raney nickel, the temperature being kept at 120° C. and the hydrogen pressure at 50–70 atm. The catalyst is filtered off, the hydroxycarboxylic acid is liberated by acidifying the filtrate and is converted into the corresponding lactone by brief heating. The lactone formed is extracted with ether and distilled under reduced pressure, the boiling point of the lactone at 12 mm. Hg being 145–146° C. The yield obtained amounts to 86% of the theory.

Starting from 4-allylcyclohexane-1,3-dione the above lactone is obtained by the same sequence of reactions and in the same yield.

EXAMPLE 2

*Lactone of 5-Hydroxydecanoic Acid*

A solution of 16.7 grams 4-crotylcyclohexane-1,3-dione, M.P. 140° C., made from equimolecular amounts of cyclohexandione, KOH and crotyl bromide, and 17 grams NaOH in 150 ml. $H_2O$ is agitated for 12 hours under hydrogen with the addition of Raney nickel, the temperature being kept at 140° C. and the hydrogen pressure at 50–70 atm. The catalyst is filtered off, the hydroxycarboxylic acid liberated by acidification and converted into the corresponding lactone by heating. The lactone formed is extracted with ether and distilled. The boiling point of the above compound at 11 mm. Hg is 157° C. The yield obtained amounts to 87% of the theory.

EXAMPLE 3

*Lactone of 5-Hydroxyhexanoic Acid*

10 grams of cyclohexane-1,3-dione are dissolved with 11 grams NaOH in 100 ml. $H_2O$ and agitated with the addition of Raney nickel for 14 hours under hydrogen at a temperature of 120° C. and a hydrogen pressure of 50–70 atm. The hydroxycarboxylic acid is liberated by acidification and is converted into the lactone by heating. The lactone is then extracted with ether and distilled under reduced pressure. It boils under 15 mm. Hg at 118–120° C. The yield obtained amounts to 83% of the theory.

EXAMPLE 4

*Dilactone of 5,9-Dihydroxytridecanedioic Acid*

11.8 grams of bis-(2,6-diketocyclohexyl)-methane (H. Stetter, Zeitschrift für angewandte Chemie 67, 769 (1955)), and 8 g. NaOH in 70 ml. $H_2O$ are agitated under hydrogen with addition of Raney nickel. The temperature is kept at 120° C. and the hydrogen pressure at 50–70 atm. After filtering off the catalyst the hydroxycarboxylic acid is isolated by acidification, and converted into the lactone by heating and the lactone is extracted from the acidic solution with ether. The boiling point of the above compound at 0.33 mm. Hg is 221–223° C. The yield obtained amounts to 82% of the theory.

The examples given are merely illustrative and do not limit the scope and the spirit of the invention. It is to be understood that alterations and modifications can be effected, e.g. the method claimed can also be conducted without agitation, the yield being, however, reduced considerably if there is not provided a greater reaction volume.

What we claim is:

1. A process for the production of lactones of saturated delta-hydroxycarboxylic acids having more than 5 carbon atoms, which comprises treating a substance selected from the class consisting of cyclohexane-1,3-dione, 4-propylcyclohexane-1,3-dione, 4-allylcyclohexane-1,3-dione, 4-crotylcyclohexane-1,3-dione and bis-(2,6-diketocyclohexanyl)-methane in solution in strong aqueous alkali with hydrogen under pressure in the presence of a hydrogenation catalyst, acidifying the resulting solution having an alkali-metal salt of the hydroxycarboxylic acid to liberate said acid, and heating the liberated acid to form the corresponding lactone therefrom.

2. A process as claimed in claim 1, in which the substance being treated is 4-propylcyclohexane-1,3-dione.

3. A process as claimed in claim 1, in which the substance being treated is 4-allylcyclohexane-1,3-dione.

4. A process as claimed in claim 1, in which the substance being treated is 4-crotylcyclohexane-1,3-dione.

5. A process as claimed in claim 1, in which the substance being treated is cyclohexane-1,3-dione.

6. A process as claimed in claim 1, in which the substance being treated is bis-(2,6-diketocyclohexanyl)-methane.

No references cited.